US010732685B2

(12) United States Patent
Yuan et al.

(10) Patent No.: US 10,732,685 B2
(45) Date of Patent: Aug. 4, 2020

(54) SYSTEM AND METHOD FOR OPERATING POWER CONVERTERS

(71) Applicant: General Electric Company, Schenectady, NY (US)

(72) Inventors: Zhihui Yuan, Bavaria (DE); Stefan Schroeder, Bavaria (DE); Qingyun Chen, Bavaria (DE); Jie Shen, Shanghai (CN); Nora Cheng-Huei Han, Zurich (CH)

(73) Assignee: GE Energy Power Conversion Technology Limited, Warwickshire (GB)

( * ) Notice: Subject to any disclaimer, the term of this patent is extended or adjusted under 35 U.S.C. 154(b) by 864 days.

(21) Appl. No.: 14/633,296

(22) Filed: Feb. 27, 2015

(65) Prior Publication Data

US 2016/0252941 A1 Sep. 1, 2016

(51) Int. Cl.
*G06F 1/26* (2006.01)
*H02M 7/483* (2007.01)
(Continued)

(52) U.S. Cl.
CPC ............ *G06F 1/263* (2013.01); *G06F 1/3209* (2013.01); *G06F 1/3212* (2013.01);
(Continued)

(58) Field of Classification Search
CPC ........ H02M 7/49; H02M 7/483; H02M 7/487; H02M 7/497; H02M 7/068; H02M 7/006;
(Continued)

(56) References Cited

U.S. PATENT DOCUMENTS 5,642,275 A 6/1997 Peng et al.
5,940,285 A 8/1999 Carrere et al.
(Continued)

FOREIGN PATENT DOCUMENTS

CN 103887954 A 6/2014
EP 1742342 A1 1/2007
(Continued)

OTHER PUBLICATIONS

Silva, E. I. et al., "Predictive Control of a Flying Capacitor Converter", Proceedings of the 2007 American Control Conference, pp. 3763-3768, Jul. 9, 2007.
(Continued)

*Primary Examiner* — Adolf D Berhane
*Assistant Examiner* — Kevin H Sprenger
(74) *Attorney, Agent, or Firm* — Armstrong Teasdale LLP

(57) ABSTRACT

A method of operating a multilevel power converter includes using, through a processing device, a model of an electrical circuit that includes a plurality of switching devices, a plurality of flying capacitors, and an AC terminal. The method also includes regulating a voltage level of the AC terminal through selecting, at least partially based on the model, a possible charging state of the electrical circuit. Each possible switching state has a voltage level that at least partially corresponds to a commanded voltage level for the AC terminal. The method further includes selecting, at least partially based on the model of the electrical circuit and at least partially based on the selected possible switching state, a charging state from a plurality of possible charging states. The method also includes setting the switching state of the electrical circuit at least partially based on the selected charging state of the electrical circuit.

29 Claims, 9 Drawing Sheets

(51) Int. Cl.

| | |
|---|---|
| ***G06F 1/3209*** | (2019.01) |
| ***G06F 1/3212*** | (2019.01) |
| ***G06F 1/3287*** | (2019.01) |
| *H02M 1/00* | (2006.01) |

(52) U.S. Cl.

CPC .......... *G06F 1/3287* (2013.01); *H02M 7/483* (2013.01); *H02M 2001/0012* (2013.01)

(58) Field of Classification Search

CPC .......... H02M 7/153; H02M 7/06; H02M 7/08; H02M 7/10; H02M 7/19; H02M 7/106; H02M 7/103; H02M 7/17; H02M 7/493; H02M 7/53806; H02M 7/217; H02M 7/219; H02M 7/537; H02M 7/003; H02M 7/5387; H02M 7/538; H02M 7/53871; H02M 3/1584; H02M 3/285; H02M 3/33561; H02M 3/33569; H02M 3/3376; H02M 3/33592; H02M 3/33523; H02M 2001/0012; H02J 1/102; Y02B 70/126; G06F 1/263; G06F 1/3209; G06F 1/3212; G06F 1/3287

USPC ....................... 363/43, 65–72, 127, 131–132

See application file for complete search history.

(56) References Cited

U.S. PATENT DOCUMENTS

| | | | | |
|---|---|---|---|---|
| 7,710,082 | B2 * | 5/2010 | Escobar Valderrama | H02J 3/1857 323/207 |
| 8,144,491 | B2 | 3/2012 | Bendre et al. | |
| 8,730,696 | B2 * | 5/2014 | Barbosa | H02M 7/483 363/132 |
| 9,325,252 | B2 * | 4/2016 | Narimani | H02M 5/4585 |
| 9,413,268 | B2 * | 8/2016 | Fu | H02M 7/487 |
| 2012/0218795 | A1 | 8/2012 | Mihalache | |
| 2013/0014384 | A1 * | 1/2013 | Xue | H02M 7/483 29/825 |
| 2013/0169257 | A1 | 7/2013 | Baek et al. | |
| 2014/0009984 | A1 * | 1/2014 | Takizawa | H02M 7/00 363/65 |
| 2015/0311776 | A1 * | 10/2015 | Lavieville | H02M 7/487 363/65 |
| 2015/0333654 | A1 * | 11/2015 | Song | H02M 7/49 363/89 |
| 2016/0211762 | A1 * | 7/2016 | Cheng | H02M 7/483 |

FOREIGN PATENT DOCUMENTS

| | | | |
|---|---|---|---|
| EP | 1742343 | A1 | 1/2007 |
| EP | 2 784 926 | A3 | 11/2014 |
| FR | 3 001 592 | A1 | 8/2014 |
| KR | 100706821 | B1 | 4/2007 |
| WO | 2014046555 | A1 | 3/2014 |

OTHER PUBLICATIONS

Lezana, P. et al., “Model Predictive Control of an Asymmetric Flying Capacitor Converter”, IEEE Transactions on Industrial Electronics, vol. No. 56. Issue No. 6., pp. 1839-1846, Jun. 2009.

Stolze, P. et al.,“Finite-Set Mode Predictive Control of a Flying Capacitor Converter with Heuristic Voltage Vector Preselection”, 8th International Conference on Power Electronics—ECCE ASIA (ICPE&ECCE), pp. 210-217, May 30, 2011.

European Search Report and Written Opinion issued in connection with corresponding EP Application No. 16156442.2 dated Jul. 29, 2016.

Gateau et al., “Multicell Converters: Active Control and Observation of Flying-Capacitor Voltages”, Industrial Electronics, IEEE Transactions on (vol. 49 , Issue: 5), pp. 998-1008, Oct. 2002.

Ruelland et al., “Design of FPGA-Based Emulator for Series Multicell Converters Using Co-Simulation Tools”, Power Electronics, IEEE Transactions on (vol. 18 , Issue: 1), pp. 455-463, Jan. 2003.

McGrath et al., “Optimal Modulation of Flying Capacitor and Stacked Multicell Converters Using a State Machine Decoder”, Power Electronics, IEEE Transactions on (vol. 22 , Issue: 2), pp. 508-516, Mar. 2007.

Lienhardt et al., “Digital Sliding-Mode Observer Implementation Using FPGA”, Industrial Electronics, IEEE Transactions on (vol. 54 , Issue: 4), pp. 1865-1875, Aug. 2007.

Smida et al., “Modeling and DBC-PSC-PWM Control of a Three-Phase Flying-Capacitor Stacked Multilevel Voltage Source Inverter”, Industrial Electronics, IEEE Transactions on (vol. 57 , Issue: 7), pp. 2231-2239, Jul. 2010.

Lezana, P., et al., “Model Predictive Control of an Asymmetric Flying Capacitor Converter,” IEEE Transactions on Industrial Electronics, vol. 56, Issue.6, pp. 1839-1846 (Jun. 30, 2009).

Narimani, M., et al., “Model Predictive Control of Nested Neutral Point Clamped(NNPC) Converter,” 2014 IEEE energy conversion congress and exposition(ECCE),pp. 1174-1179 (Sep. 14, 2014).

Stolze P. et al., “Finite-set model predictive control of a flying capacitor converter with heuristic voltage vector preselection, 8th International Conference on Power Electronics—ECCE Asia IEEE,” pp. 210-217 (May 30-Jun. 3, 2011).

Machine Translation and First office action and Search issued in connection with corresponding CN Application No. 201610106262.5 dated Dec. 28, 2018.

* cited by examiner

| Voltage level | Switching states | | |
|---|---|---|---|
| +3 | | [1 1 1] | |
| +2 | [0 1 1] 410 | [1 0 1] 412 | [1 1 0] 414 |
| +1 | [0 0 1] | [0 1 0] | [1 0 0] |
| 0 | | [0 0 0] | |
| -1 | [0 0 -1] | [1 -1 0] | [-1 0 0] |
| -2 | [0 -1 -1] | [-1 0 -1] | [-1 -1 0] |
| -3 | | [-1 -1 -1] | |

404

| Voltage level | Switching states | | |
|---|---|---|---|
| +3 | | [1 1 1] | |
| +2 | [0 1 1] | [1 0 1] | [1 1 0] |
| +1 | [0 0 1] | [0 1 0] | [1 0 0] |
| 0 | [0 0 0] | | |
| -1 | [0 0 -1] | [0 -1 0] | [-1 0 0] |
| -2 | [0 -1 -1] | [-1 0 -1] | [-1 -1 0] |
| -3 | [-1 -1 -1] | | |

→

420

| Voltage level | Charging states | | | |
|---|---|---|---|---|
| +3 | | [0 0] | | |
| +2 | [-1 0] | [1 -1] | [0 1] | Cap. +2, +1 |
| +1 | [0 -1] | [-1 1] | [1 0] | |
| 0 | [0 0] | | | |
| -1 | [0 1] | [1 -1] | [-1 0] | Cap. -2, -1 |
| -2 | [1 0] | [-1 1] | [0 -1] | |
| -3 | [0 0] | | | |

FIG. 5

SYSTEM AND METHOD FOR OPERATING POWER CONVERTERS

BACKGROUND

The field of the disclosure relates generally to electric power converter equipment and, more particularly, to a system and method for operation of multilevel converters.

Many known multilevel power converters are in use throughout various industries and for a variety of purposes for electric power conversion. Such industries include, without limitation, metals, mining, power, water, oil, and gas.

Specifically, the term "multilevel converter" refers to a converter that can operate in an inverter mode and in a rectifier mode. Some known devices that use multilevel converters include a separated power conversion assembly, or system, electrically coupled to an alternating current (AC) power source, e.g., a utility power grid. Such known separated power conversion assemblies include a rectifier portion that converts the AC transmitted by the utility power generation grid to direct current (DC) and an inverter portion that converts the DC to AC of a predetermined frequency and voltage amplitude. The rectifier portion and the inverter portion use multilevel power converters that may shift between operating as a rectifier and operating as an inverter. Most known multilevel converters include semiconductor-based switching devices, e.g., integrated gate-commutated thyristors (IGCTs) or insulated gate bipolar transistors (IGBTs). The rectifier and inverter portions are typically electrically coupled via a medium voltage DC (MVDC) or a high voltage DC (HVDC) link.

Various known multilevel converter topologies are in service or have been available for service. Many of the DC links for known multilevel converters include capacitors to facilitate levelizing DC voltage within the DC link to stabilize power transmission between the multilevel converters. These capacitors are referred to as "flying capacitors." The voltages of the flying capacitors vary throughout operation of the associated multilevel converters as the operation of the switching devices in the converter vary. Also, the output voltage pattern and the blocking voltage of each switching device are determined by the flying capacitor voltages. In order to get the appropriate multilevel output with low harmonic distortion and prevent the devices from attaining overvoltage conditions, the flying capacitor voltages are maintained at or near certain voltage levels, which are normally defined as references, or reference voltages for the flying capacitors through all modes of operation of the multilevel converters, including startup. However, in many known multilevel converter topologies, e.g., nested neutral point piloted (NPP) converter topologies there are a large number of switching devices and flying capacitors charging and discharging substantially simultaneously. Therefore, the voltages of the large number of flying capacitors may not be balanced thereby resulting in distortion in the multilevel pulse pattern in the output voltage waveforms at the output of the converter. As such, filtering devices are required at the output of the converters to filter out the distortions in the voltage waveforms. The filters increase the costs of assembling and maintaining the multilevel converters.

Some known multilevel converters use phase-shifted pulse width modulation (PWM) features to facilitate balancing the flying capacitor voltages. However, this method requires additional hardware, which drive up the cost of the converters, with marginal positive results. Also, some known multilevel converters use software-based solutions that facilitate reducing a difference between the real-time capacitor voltages and the associated reference voltages. These solutions are computer resource intensive due to the large number of devices and the speed of the power conversion process, thereby resulting in complicated control mechanisms.

BRIEF DESCRIPTION

In one aspect, a method of operating a power converter is provided. The method includes regulating a voltage level of the at least one AC terminal through using, through a processing device, a model of an electrical circuit, the electrical circuit including a plurality of switching devices, a plurality of flying capacitors, and at least one alternating current (AC) terminal. The method also includes selecting, at least partially based on the model of the electrical circuit, at least one possible switching state of the electrical circuit from a plurality of possible switching states of the electrical circuit. Each possible switching state of the electrical circuit has a voltage level that at least partially corresponds to a commanded voltage level for the at least one AC terminal. Each possible switching state of the electrical circuit defines a switching state of each switching device of the plurality of switching devices. Each switching state of the electrical circuit has a corresponding charging state of the electrical circuit. The method further includes selecting, at least partially based on the model of the electrical circuit and at least partially based on the selected possible switching state of the electrical circuit, a possible charging state of the electrical circuit. Each possible charging state of the electrical circuit defines a charging state of each flying capacitor of the plurality of flying capacitors. Selecting a possible charging state of the electrical circuit includes resolving conflicting charging states of each flying capacitor of the plurality of flying capacitors and selecting a switching state corresponding to the commanded voltage level. The method also includes setting the switching state of the electrical circuit at least partially based on the selected charging state of the electrical circuit.

In a further aspect, an electrical circuit for a multilevel power converter is provided. The electrical circuit includes a plurality of electrically conductive elements configured substantially parallel to each other. The electrical circuit also includes a plurality of switching devices. Each switching device of the plurality of switching devices is coupled to one electrically conductive element of the plurality of electrically conductive elements. The electrical circuit further includes a plurality of flying capacitors coupled to each of two adjacent electrically conductive elements of the plurality of electrically conductive elements. In addition, the electrical circuit includes at least one alternating current (AC) terminal. The electrical circuit also includes a processing device including a model of the electrical circuit resident thereon. The processing device is configured to select, at least partially based on the model of the electrical circuit, at least one possible switching state of the electrical circuit from a plurality of possible switching states of the electrical circuit. Each possible switching state of the electrical circuit has a voltage level that at least partially corresponds to a commanded voltage level for the at least one AC terminal. Each possible switching state of the electrical circuit defines a switching state of each switching device of the plurality of switching devices. Each switching state of the electrical circuit has a corresponding charging state of the electrical circuit. The processing device is also configured to select a possible charging state of the electrical circuit at least partially based on the model of the electrical circuit and at least partially based on the selected possible switching state of the electrical circuit. Each possible charging state of the electrical circuit defines a charging state of each flying capacitor of the plurality of flying capacitors. Selecting a possible charging state of the electrical circuit includes resolving conflicting charging states of each flying capacitor of the plurality of flying capacitors and selecting a switching state corresponding to the commanded voltage level. The processing device is also configured to set the switching state of the electrical circuit at least partially based on the selected charging state of the electrical circuit.

In another aspect, an electric power system is provided. The system includes an alternating current (AC) source, a direct current (DC) link, and a multilevel power converter including an electrical circuit extending between the AC source and the DC link. The electrical circuit includes a plurality of electrically conductive elements configured substantially parallel to each other. The electrical circuit also includes a plurality of switching devices. Each switching device of the plurality of switching devices is coupled to one electrically conductive element of the plurality of electrically conductive elements. The electrical circuit further includes a plurality of flying capacitors coupled to each of two adjacent electrically conductive elements of the plurality of electrically conductive elements. In addition, the electrical circuit includes at least one alternating current (AC) terminal. The electrical circuit also includes a processing device including a model of the electrical circuit resident thereon. The processing device is configured to select, at least partially based on the model of the electrical circuit, at least one possible switching state of the electrical circuit from a plurality of possible switching states of the electrical circuit. Each possible switching state of the electrical circuit has a voltage level that at least partially corresponds to a commanded voltage level for the at least one AC terminal. Each possible switching state of the electrical circuit defines a switching state of each switching device of the plurality of switching devices. Each switching state of the electrical circuit has a corresponding charging state of the electrical circuit. The processing device is also configured to select a possible charging state of the electrical circuit at least partially based on the model of the electrical circuit and at least partially based on the selected possible switching state of the electrical circuit. Each possible charging state of the electrical circuit defines a charging state of each flying capacitor of the plurality of flying capacitors. Selecting a possible charging state of the electrical circuit includes resolving conflicting charging states of each flying capacitor of the plurality of flying capacitors and selecting a switching state corresponding to the commanded voltage level. The processing device is also configured to set the switching state of the electrical circuit at least partially based on the selected charging state of the electrical circuit.

DRAWINGS

These and other features, aspects, and advantages of the present disclosure will become better understood when the following detailed description is read with reference to the accompanying drawings in which like characters represent like parts throughout the drawings, wherein:

FIG. 5 is a tabular representation of a relationship between the plurality of switching states shown in FIG. 4 and a plurality of charging states of the capacitors of multilevel power converter electrical circuit shown in FIG. 3;

Figure 1:
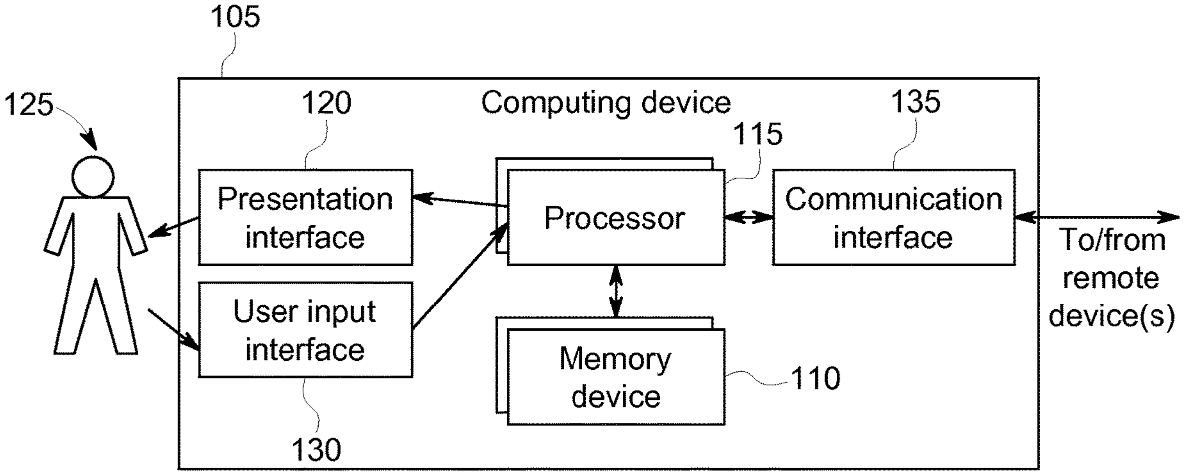
FIG. 1 is a block diagram of an exemplary computing device.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms “a”, “an”, and “the” include plural references unless the context clearly dictates otherwise.

“Optional” or “optionally” means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as “about”, “approximately”, and “substantially”, are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms “processor” and “computer” and related terms, e.g., “processing device”, “computing device”, and “controller” are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processing device, cause the processing device to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

Moreover, as used herein, the terms "switching state" and "switching states" refer to a one or more defined states of the switching devices described herein. The electrical circuits and the associated portions as described herein include a plurality of switching devices. As such, "switching state" and "switching states" also refers to one or more aggregated switching states of the electrical circuits and portions thereof based on the individual switching states of the associated switching devices. Similarly, as used herein, the terms "charging state" and "charging states" refer to one or more defined states of the capacitive devices, i.e., flying capacitors described herein. The electrical circuits and associated portions described herein include a plurality of flying capacitors. As such, "charging state" and "charging states" also refers to one or more aggregated charging states of the electrical circuits and portions thereof based on the individual charging states of the associated flying capacitors.

The multilevel power converters and their associated control systems described herein provide for enhanced control of electric power conversion. Specifically, the embodiments described herein facilitate balancing the voltages of the flying capacitors within the power converters. Using a seven-level topology, the multilevel power converters described herein generate a low-distortion multilevel pulse pattern and higher output voltages at the output of the power converters as compared to known converters. Such higher voltages include 10 kilovolts (kV) and 13.8 kV at the outputs of medium voltage converters. As such, the multilevel power converters described herein facilitate improved total harmonic distortion (THD) performance and increased electric power conversion. The improved THD performance facilitates decreasing the size and complexity of electrically coupled harmonic filters, thereby decreasing the costs of assembling, operating, and maintaining electric power systems. In addition, rather than the additional costs associated with the additional hardware for voltage balancing power circuits, balancing of the voltage associated with the flying capacitors is achieved through software-implemented balancing algorithms and instructions. The balancing algorithms and instructions described herein convert switching states, i.e., aggregate switching configurations within the electrical circuit defined by the associated switching devices to aggregate charging states of the electrical circuit defined by the flying capacitors. Moreover, the multilevel power converters and associated control systems described herein facilitate a two-step process, where the first pulse-width-modulation (PWM) generation step is decoupled from the second state selection step.

FIG. 1 is a block diagram of an exemplary computing device 105 that may be used to control a power converter that includes electrical circuits (neither shown in FIG. 1). More specifically, computing device 105 facilitates generating, and/or storing, a model of an electrical circuit within the power converter. Computing device 105 also facilitates selecting a possible switching state of the electrical circuit. Computing device 105 further facilitates selecting a charging state based on the model, the possible switching state, and resolved conflicts of possible charging states. Computing device 105 also facilitates selecting a switching state corresponding to a commanded voltage level and then setting the switching state of the electrical circuit accordingly. The model of the electrical circuit architecture uses a physics-based model representative of at least a portion of the circuit. Computing device 105 includes a memory device 110 and a processing device 115 operatively coupled to memory device 110 for executing instructions. In some embodiments, executable instructions are stored in memory device 110. Computing device 105 is configurable to perform one or more operations described herein by programming processing device 115. For example, processing device 115 may be programmed by encoding an operation as one or more executable instructions and providing the executable instructions in memory device 110. In the exemplary embodiment, memory device 110 is one or more devices that enable storage and retrieval of information such as executable instructions and/or other data. Memory device 110 may include one or more computer readable media.

Memory device 110 may be configured to store operational measurements including, without limitation, real-time and historical switching and charging states for the flying capacitors within the electrical circuit within the power converter as well as possible future switching and charging states, and/or any other type data. Also, memory device 110 includes, without limitation, sufficient data, algorithms, and commands to facilitate generating and/or storing physics-based models of electrical circuits associated with power converters, including multilevel power converters, and use the models to generate possible future switching and charging states of the flying capacitors in the electrical circuits.

In some embodiments, computing device 105 also includes sufficient computer-readable/executable instructions, data structures, program modules, and program sub-modules, to receive other data associated with measured values from other power converters and power converter control systems to facilitate overall operation of the power converter.

In some embodiments, computing device 105 includes a presentation interface 120 coupled to processing device 115. Presentation interface 120 presents information, such as a user interface and/or an alarm, to a user 125. In some embodiments, presentation interface 120 includes one or more display devices. In some embodiments, presentation interface 120 presents an alarm associated with the associated power converters, such as by using a human machine interface (HMI) (not shown in FIG. 1). Also, in some embodiments, computing device 105 includes a user input interface 130. In the exemplary embodiment, user input interface 130 is coupled to processing device 115 and receives input from user 125.

A communication interface 135 is coupled to processing device 115 and is configured to be coupled in communication with one or more other devices, such as another computing device 105, and to perform input and output operations with respect to such devices while performing as an input channel. Communication interface 135 may receive data from and/or transmit data to one or more remote devices. For example, a communication interface 135 of one computing device 105 may transmit a corrective algorithm to the communication interface 135 of another computing device 105. In some embodiments, communication interface 135 is a wireless interface. In some embodiments, communication interface 135 is configured to enable communication through a short range wireless communication protocol such as Bluetooth™ or Z-Wave™, through a wireless local area network (WLAN) implemented pursuant to an IEEE (Institute of Electrical and Electronics Engineers) 802.11 standard (i.e., WiFi), and/or through a mobile phone (i.e., cellular) network (e.g., Global System for Mobile communications (GSM), 3G, 4G) or other mobile data network (e.g., Worldwide Interoperability for Microwave Access (WIMAX)), or a wired connection (i.e., one or more conductors for transmitting electrical signals). In embodiments that communication interface 135 couples computing device 105 to one or more field measurement apparatus, communication interface 135 may include, for example, one or more conductors for transmitting electrical signals and/or power to and/or from the field measurement apparatus.

Figure 2:
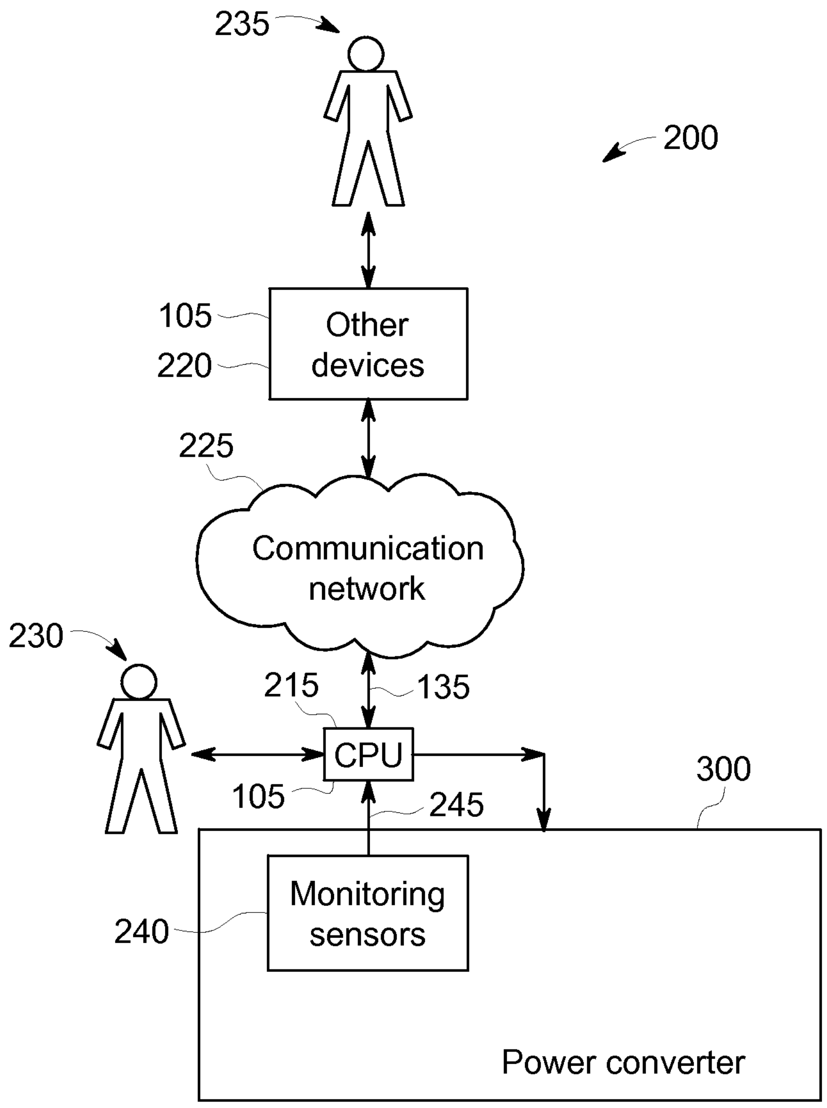
FIG. 2 is a block diagram of a portion of an exemplary power converter control system that may include the computing device shown in FIG. 1.

FIG. 2 is a block diagram of a portion of a power converter control system 200 that may be used to monitor and control at least a portion of a multilevel power converter 300. In some embodiments, power converter control system 200 also includes sufficient computer-readable/executable instructions, data structures, program modules, and program sub-modules, to receive other data associated with measured values from other wind turbine systems to facilitate overall operation of multilevel power converter 300. Alternatively, power converter control system 200 is a stand-alone system. Further, alternatively, power converter control system 200 is any computer-based system that may monitor portions of, and generate and/or store models for multilevel power converter 300, including, without limitation, the electrical circuits therein (not shown in FIG. 2). In the exemplary embodiment, power converter control system 200 includes at least one central processing unit (CPU) 215 configured to execute monitoring and control algorithms and logic. CPU 215 may be coupled to other devices 220 via a network 225. In some embodiments, network 225 is a wireless network.

Referring to FIGS. 1 and 2, CPU 215 is a computing device 105. In the exemplary embodiment, computing device 105 is coupled to network 225 via communication interface 135. In an alternative embodiment, CPU 215 is integrated with other devices 220.

CPU 215 interacts with a first operator 230, e.g., without limitation, via user input interface 130 and/or presentation interface 120. In one embodiment, CPU 215 presents information about multilevel power converter 300, such as measured flying capacitor voltages and currents, to operator 230. Other devices 220 interact with a second operator 235, e.g., without limitation, via user input interface 130 and/or presentation interface 120. For example, other devices 220 present alarms and/or other operational information to second operator 235. As used herein, the term "operator" includes any person in any capacity associated with operating and maintaining multilevel power converter 300, including, without limitation, shift operations personnel, maintenance technicians, and facility supervisors.

In the exemplary embodiment, multilevel power converter 300 includes one or more monitoring sensors 240 coupled to CPU 215 through at least one input channel 245. Monitoring sensors 240 collect operational measurements including, without limitation, measured flying capacitor voltages and currents from portions of multilevel power converter 300. Monitoring sensors 240 may also collect other operational measurements including, without limitation, overall power, voltage, and current inputs and outputs in portions of multilevel power converter 300. Monitoring sensors 240 repeatedly, e.g., periodically, continuously, and/or upon request, transmit operational measurement readings at the time of measurement. CPU 215 receives and processes the operational measurement readings. Such data is transmitted across network 225 and may be accessed by any device capable of accessing network 225 including, without limitation, desktop computers, laptop computers, and personal digital assistants (PDAs) (neither shown).

Figure 3:
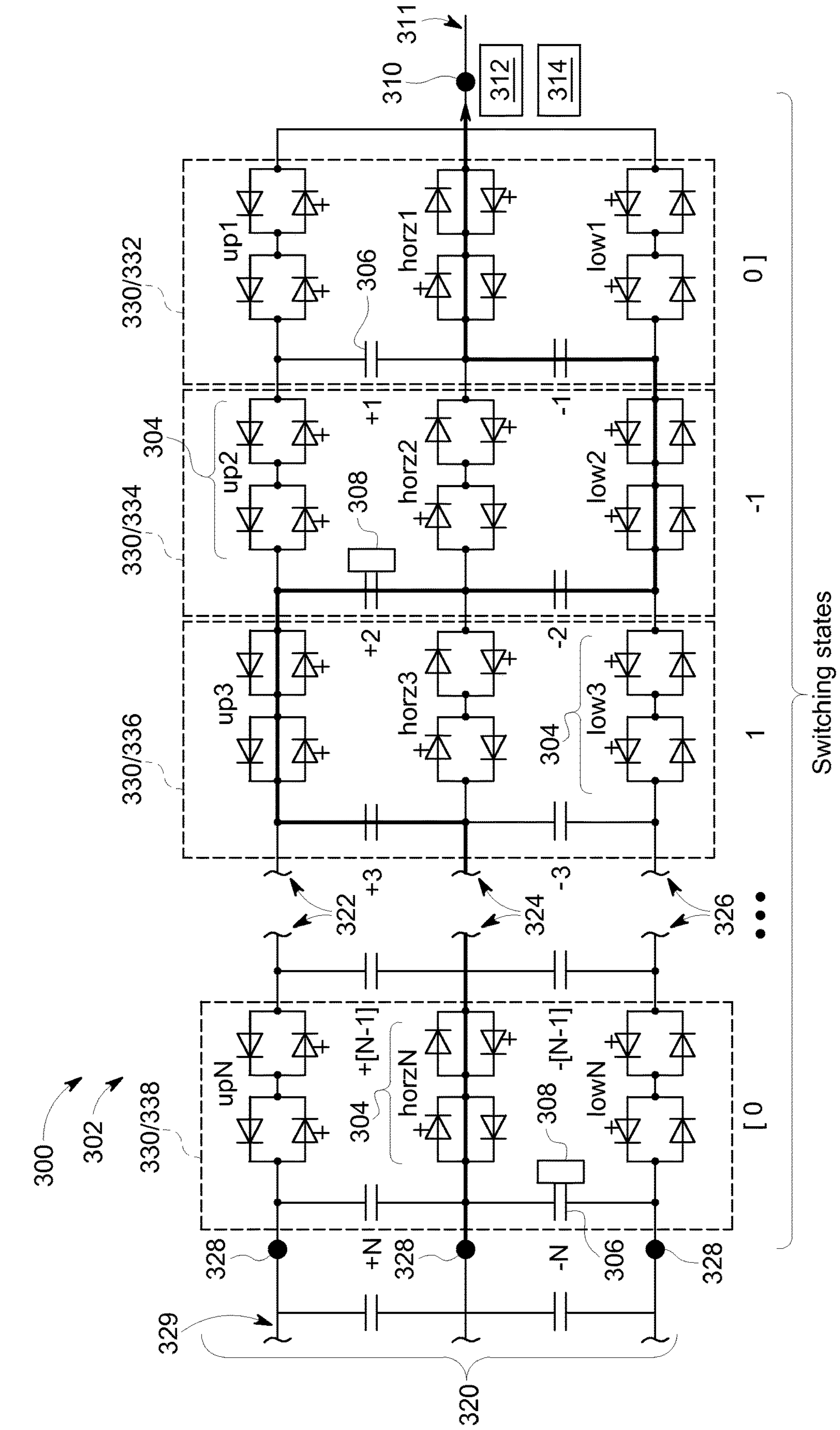
FIG. 3 is a schematic diagram of an exemplary multilevel power converter electrical circuit topology that may be controlled by the power converter control system shown in FIG. 2 with a plurality of switching states shown thereon.

FIG. 3 is a schematic diagram of a topology of an exemplary electrical circuit 302 for multilevel power converter 300 that may be controlled by power converter control system 200 (shown in FIG. 2) with a plurality of switching states shown thereon. Electrical circuit 302 is modeled within processing devices 115 and 215 (shown in FIGS. 1 and 2, respectively) using any modeling software applications that enable operation of electrical circuit 302 and power converter control system 200 as described herein.

In the exemplary embodiment, electrical circuit topology 302 is a nested neutral point piloted (NPP) converter topology including a plurality of switching devices 304 (only three sets labeled in FIG. 3) and a plurality of flying capacitors 306 (only two labeled in FIG. 3). At least one voltage measurement device 308 is used to measure real-time voltage across each flying capacitor 306 (only two shown in FIG. 3). Electrical circuit 302 also includes at least one alternating current (AC) terminal 310 coupled to a phase of a larger AC system 311. A current measurement device 312 is used to measure real-time electric current transmitted through AC terminal 310 (in either direction). Similarly, a voltage measurement device 314 is used to measure real-time voltage induced at AC terminal 310.

Also, electrical circuit 302 includes a plurality of electrically conductive elements 320 configured substantially parallel to each other. In the exemplary embodiment, elements 320 include three elements, i.e., an upper conductive element 322, a middle element, i.e., a horizontal conductive element 324, and a lower conductive element 326. Alternatively, any number of conductive elements 320 is used that enables operation of electrical circuit 302 and power converter control system 200 as described herein. Each of elements 320 includes a direct current (DC) terminal 328 that coupled elements 320 to a DC link 329. Each set of switching devices 304 is coupled to a respective element 320 and flying capacitors 306 are coupled between adjacent switching devices 304 and elements 320. Switching devices 304 coupled to upper conductive element 322 are labeled "up1" through "upN". Similarly, switching devices 304 coupled to horizontal conductive element 324 are labeled "horz1" through "horzN". Also, similarly, switching devices 304 coupled to lower conductive element 326 are labeled "low1" through "lowN".

Flying capacitors 306 coupled between upper conductive element 322 and horizontal conductive element 324 have a positive polarity and are labeled "+1" through "+N". Similarly, flying capacitors 306 coupled between lower conductive element 326 and horizontal conductive element 324 have a negative polarity and are labeled "−1" through "−N". Flying capacitors 306 and switching devices 304 define a plurality of stages 330 (only four labeled in FIG. 3 as 332, 334, 336, and 338) of electrical circuit 302.

In the exemplary embodiment, each stage 330 has a predetermined switching state represented by a numeric value such that a plurality of stages 330 define a plurality of switching states for at least a portion of electrical circuit 302. The plurality of numeric values include a unique sequential combination of integers from a predetermined set of integers, and each unique sequential combination of integers defines a unique switching state of electrical circuit 302.

Specifically, each stage 330 has a switching state of "0", "1", or "−1" as a function of the respective switching state of the respective switching devices 304. For example, stage 332 has switching devices up1 and low1 in a non-conducting state while switching devices horz1 are in a conductive state. As such, stage 332 is assigned a switching state of 0. Also, for example, stage 334 has switching devices up2 and horz2 in a non-conducting state while switching devices low1 are in a conductive state. As such, stage 334 is assigned a switching state of −1. Further, for example, stage 336 has switching devices low3 and horz3 in a non-conducting state while switching devices up1 are in a conductive state. As such, stage 336 is assigned a switching state of 1. In the exemplary embodiment, values of 0, 1, and −1 are used. Alternatively, any values for switching states are used that enable operation of electrical circuit 302 and power converter control system 200 as described herein, such as, and without limitation, 1, 2, and 3. In addition, in alternative embodiments, the number of conductive elements 320 is not limited to three. For example, and without limitation, in some embodiments, there are ten conductive elements and the associated switching states are identified with the integers 1 through 10. The switching states of stages 330 shift rapidly during normal operation of electrical circuit 302 in order to generate the commanded voltage and current at AC terminal 310 and DC terminals 328. Specifically, a seven level scheme for voltage is used with electrical circuit 302 with voltage levels extending from +3 to −3 in unit increments of one, where the unitized voltage increments are normalized values for commanded voltage and measured voltage at AC terminal 310. A voltage level of +3 corresponds to a positive AC voltage peak and a voltage level of −3 corresponds to a negative AC voltage peak, both peaks associated with a sinusoidal AC voltage waveform.

Limiting the switching states to one conductive element 320 in a conducting state per predetermined cycle period facilitates removing unused and redundant switching states from consideration, for example, and without limitation, those switching states that have both "up" and "low" switching devices in a single stage 330 in a conductive state simultaneously. In the exemplary embodiment shown in FIG. 3, the sum of the switching states shown (0+1−1+0) generates an output voltage level at AC terminal 310 with a value of 0. While the switching states of electrical circuit 302 are in this condition, flying capacitors 306 are not charging or discharging. During a commanded switching event, the switching states for at least some of stages 330 are shifted and the associated flying capacitors 306 either begin to charge or discharge. As such, since the charging, discharging, and holding static of flying capacitors 306 depends upon the commanded switching orders, voltages across flying capacitors 306 are controllable such that they are balanced within electrical circuit 302.

Figure 4:
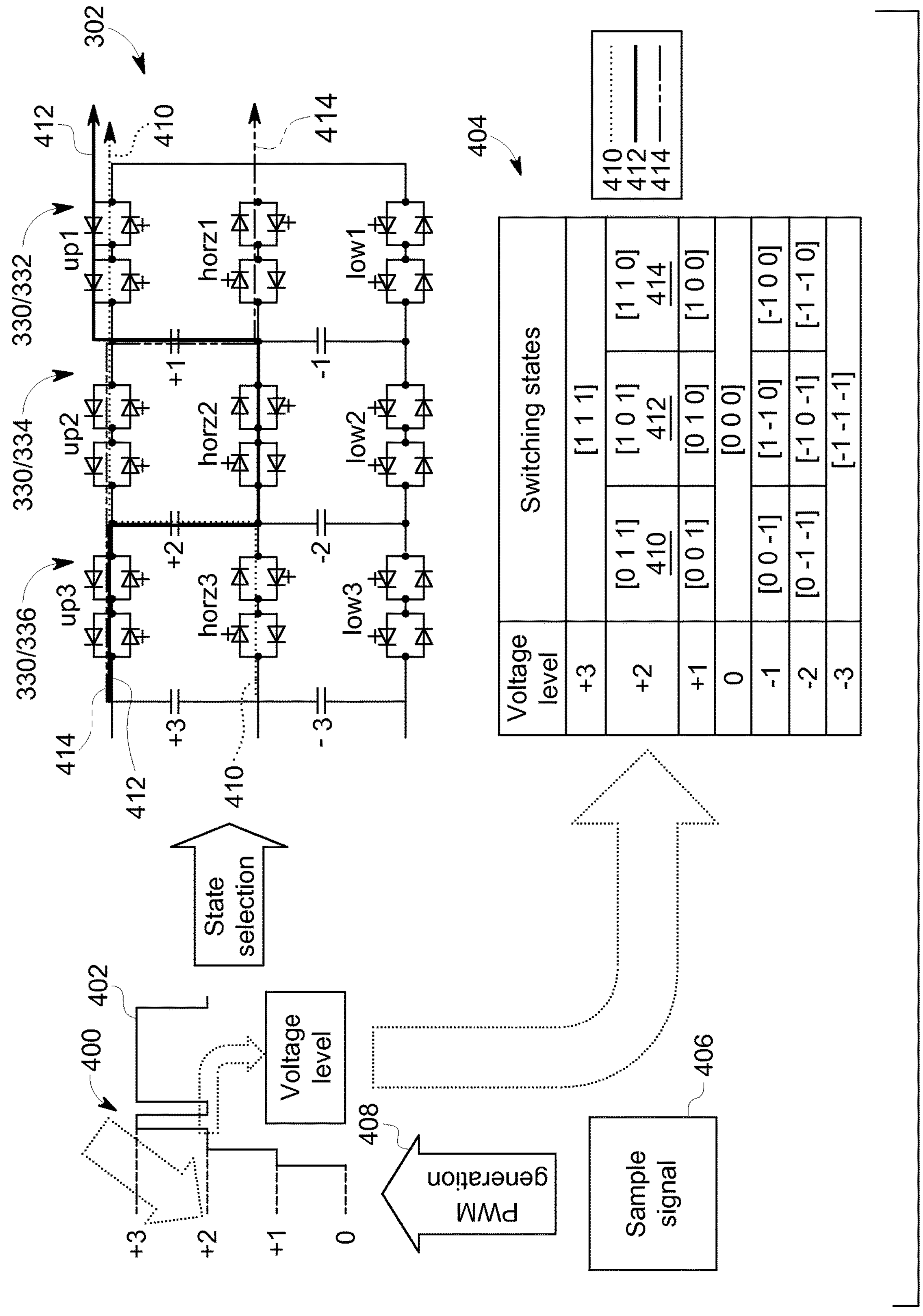
FIG. 4 shows a relationship between a graphical representation of an exemplary pulse pattern, a schematic representation of the multilevel power converter electrical circuit shown in FIG. 3 with a plurality of switching states shown thereon, and a tabular representation of a plurality of switching states that may be generated with the power converter control system shown in FIG. 2.

FIG. 4 shows a relationship between a graphical representation, i.e., graph 400 of an exemplary pulse pattern 402, a schematic representation of a portion of multilevel power converter electrical circuit 302 with a plurality of switching states shown thereon, and a tabular representation, i.e., table 404 of a plurality of switching states of electrical circuit 302 that may be generated with power converter control system 200 (shown in FIG. 2).

In the exemplary embodiment, pulse pattern 402 is generated through pulse width modulation (PWM) techniques. Alternatively, pulse pattern 402 is generated using any pulse generating technique that enables operation of electrical circuit 302 and power converter control system 200 as described herein, including, without limitation, optimized pulse pattern (OPP) pulse generation. Generation of pulse pattern 402 is performed using traditional modulation schemes and controls, and such pulse generation is decoupled from switching state selection, discussed further below. As shown, a sample signal 406 measured at, for example, and without limitation, AC terminal 310 (shown in FIG. 3) is transmitted to generate PWM pulse commands 408 for further generation of pulse pattern 402. Sample signal 406 includes a sampling of electrical conditions at AC terminal 310, including, without limitation, current, voltage, and flying capacitor voltages.

As discussed above, a seven level scheme for voltage is shown with voltage levels for 0, 1, 2, and 3 shown, and −1, −2, and −3 not shown, in graph 400. Pulse pattern 402 also includes temporal information for determining the temporal length of each commanded voltage level. Therefore, PWM pulse commands 408 are generated through a portion of power converter control system 200 not associated with switching state selection as described herein or another control system. Also, pulse commands 408 include information related to commanded voltage level at AC terminal 310 including voltage level and temporal duration of switching states 404 to obtain the commanded voltage level at AC terminal 310. Further, pulse pattern 402 generated as a function of pulse commands 408 also includes information relating to voltage level and temporal duration of switching states 404 to obtain the commanded voltage level at AC terminal 310.

Also, in the exemplary embodiment, for a selected voltage level of +2, table 404 shows that there are three possible switching states for the portion of circuit 302 shown in FIG. 4. Specifically, the three available switching states from table 404 are [0 1 1], [1 0 1], and [1 1 0] and are shown in circuit 302 as switching states 410, 412, and 414, respectively.

Referring to table 404, voltage level +3 has a single possible switching state of [1 1 1], voltage level 0 has a single possible switching state of [0 0 0], and voltage level −3 has a single possible switching state of [−1 −1 −1]. Moreover, switching states +2 (described above), +1, −1, and −2 have three possible switching states as shown.

FIG. 5 is a tabular representation of a relationship between table 404 of the plurality of switching states for multilevel power converter electrical circuit 302 (shown in FIG. 4) and a table 420 of a plurality of charging states of flying capacitors 306 in circuit 302. Table 420 of charging states is generated through taking the unique sequential combination of integers for each switching state that includes a first, second, and third integer (for the exemplary embodiment), and then subtracting the second integer from the first integer and subtracting the third integer from the second integer to generate a plurality of unique charging states that may be shared by more than one voltage level (discussed further below). For example, for switching state [1 1 1] representative of voltage level +3, first integer “1” minus second integer “1” and second integer “1” minus third integer “1” generates charging state [0 0]. Similarly, for voltage level +2, switching state [0 1 1] generates charging state [−1 0] (0 minus 1 is −1 and 1 minus 1 is 0), switching state [1 0 1] generates charging state [1 −1] (1 minus 0 is 1 and 0 minus 1 is −1), and switching state [1 1 0] generates charging state [0 1] (1 minus 1 is 0 and 1 minus 0 is 1). The charging states for voltage levels +1, 0, −1, −2, and −3 are determined in a substantially similar manner.

In the exemplary embodiment, the charging state of flying capacitors 306 in circuit 302 is identified with a two-integer designation, where the integers are chosen from the set of integers of −1 (discharging), 0 (balanced), and +1 (charging). Moreover, the first integer in the charging state represents the charging state of the flying capacitor designed as +2 or −2 and the second integer represents the charging state of the flying capacitor designated as +1 or −1. As shown in FIG. 4, switching state 412 is one of three possible switching states (410, 412, and 414) for voltage level +2. For switching state 412 [1 0 1], with a charging state of [1 −1], the flying capacitor identified as +2 is charging and the flying capacitor identified as +1 is discharging. Referring to table 420, voltage levels +2 and +1 are associated with charging and discharging of flying capacitors +2 and +1 and voltage levels −2 and −1 are associated with charging and discharging of flying capacitors −2 and −1.

There is some ambiguity with respect to charging states 420 in that there is not a one-to-one relationship between each switching state 404 and each charging state 420. For example, charging state [1 −1] corresponds to a voltage level of +2 and −1. Similarly, charging state [0 1] corresponds to either of voltage levels +2 and −1. Also, similarly, charging states [0 −1], [−1 1], [1 0], and [−1 0] correspond to more than one voltage level. Therefore, power converter control system 200 (shown in FIG. 2) is configured to resolve these ambiguities and select the charging state associated with the commanded voltage level.

Figure 6:
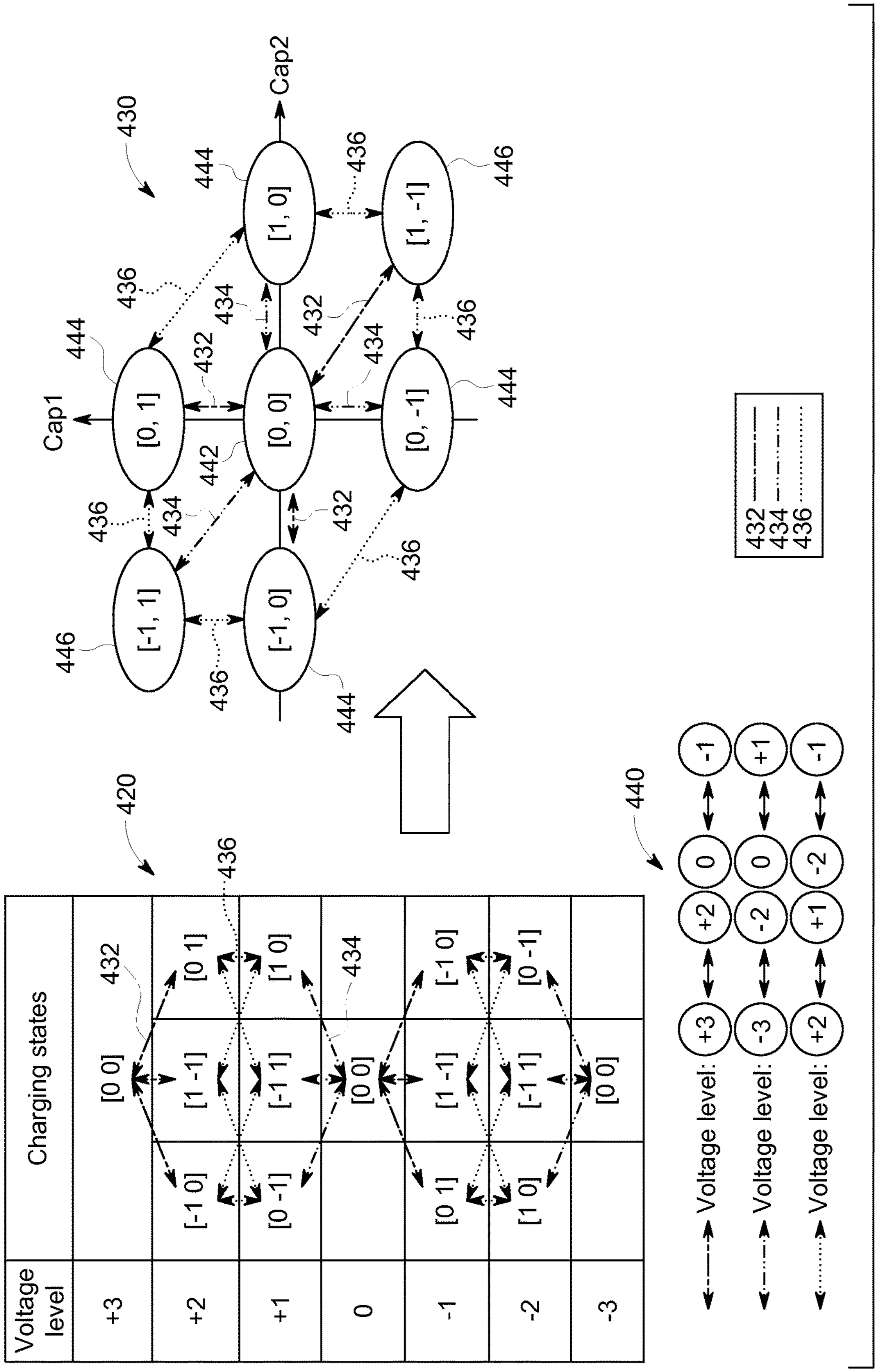
FIG. 6 shows a relationship between a tabular representation of a plurality of charging states as shown in FIG. 5 as a function of a voltage level in the pulse pattern shown in FIG. 4 and a representation of the plurality of charging states.

FIG. 6 shows a relationship between a tabular representation of a plurality of charging states (table 420) as a function of a voltage level in pulse pattern 402 (shown in FIG. 4) and a representation 430 of the plurality of charging states. A plurality of shifting arrows 432 are shown between voltage levels +3 and +2 and voltage levels 0 and −1. Also, a plurality of shifting arrows 434 are shown between voltage levels +1 and 0 and voltage levels −2 and −3. Further, a plurality of shifting arrows 436 are shown between voltage levels +2 and +1 and voltage levels −2 and −1. The association of shifting arrows 432, 434, and 436 and voltage levels +3 to −3 are shown in table 440.

Referring to table 420, the seven possible and redundant charging states [−1 1], [0 1], [−1 0], [0 0], [1 0], [0 −1], and [1 −1] are rearranged into a single instance of each charging state in representation 430 and the associated shift arrows 432, 434, and 436 are shown. In addition, the seven charging states are arranged about a pair of orthogonal axis labeled “Cap1” and “Cap2”. The vertical Cap1 axis extends upward from −1 (discharging) through 0 (static) to +1 (charging) and the horizontal Cap2 axis extends rightward from −1 (discharging) through 0 (static) to +1 (charging). Table 420 and representation 430 show that not all charging states are immediately available to be shifted to any other charging state without an intermediate charging state. Therefore, for certain combinations of switching states within circuit 302, not all charging states of flying capacitors 306 are available for the immediately pending shift. Therefore, processing devices 115 and 215 predict a plurality of possible charging states of electrical circuit 302, at least partially based on the model of electrical circuit 302 and charging state representation 430. Also, processing devices 115 and 215 select, at least partially based on the model of electrical circuit 302, a charging state from the plurality of possible charging states. Further, processing devices 115 and 215 regulate a state of each switching device 304 based on the selected charging state. Moreover, processing devices 115 and 215 regulate the induced voltage values across each flying capacitor 306 of the plurality of flying capacitors 306 based on the selected charging state and the state of each switching device 304.

The organization of the charging states in representation 430 defines three general charging states. Specifically, there is a single neutral state 442, i.e., charging state [0, 0] located at the center of representation, and neutral state 442 is the only charging state that can shift to more than two charging states. Also, there are four middle states 444, i.e., charging states [0, 1], [0, −1], [−1, 0], and [1, 0]. Further, there are two corner states 446, i.e., charging states [−1, 1] and [1, −1]. As such, three cases are solved for through power converter control system 200. The first case is when the initial, existing real-time charging state is neutral charging state 442. The second case is when the initial, existing real-time charging state is one of middle charging states 444. The third case is when the initial, existing real-time charging state is one of corner charging states 446. The significance of these three cases is discussed further below.

Figure 7:
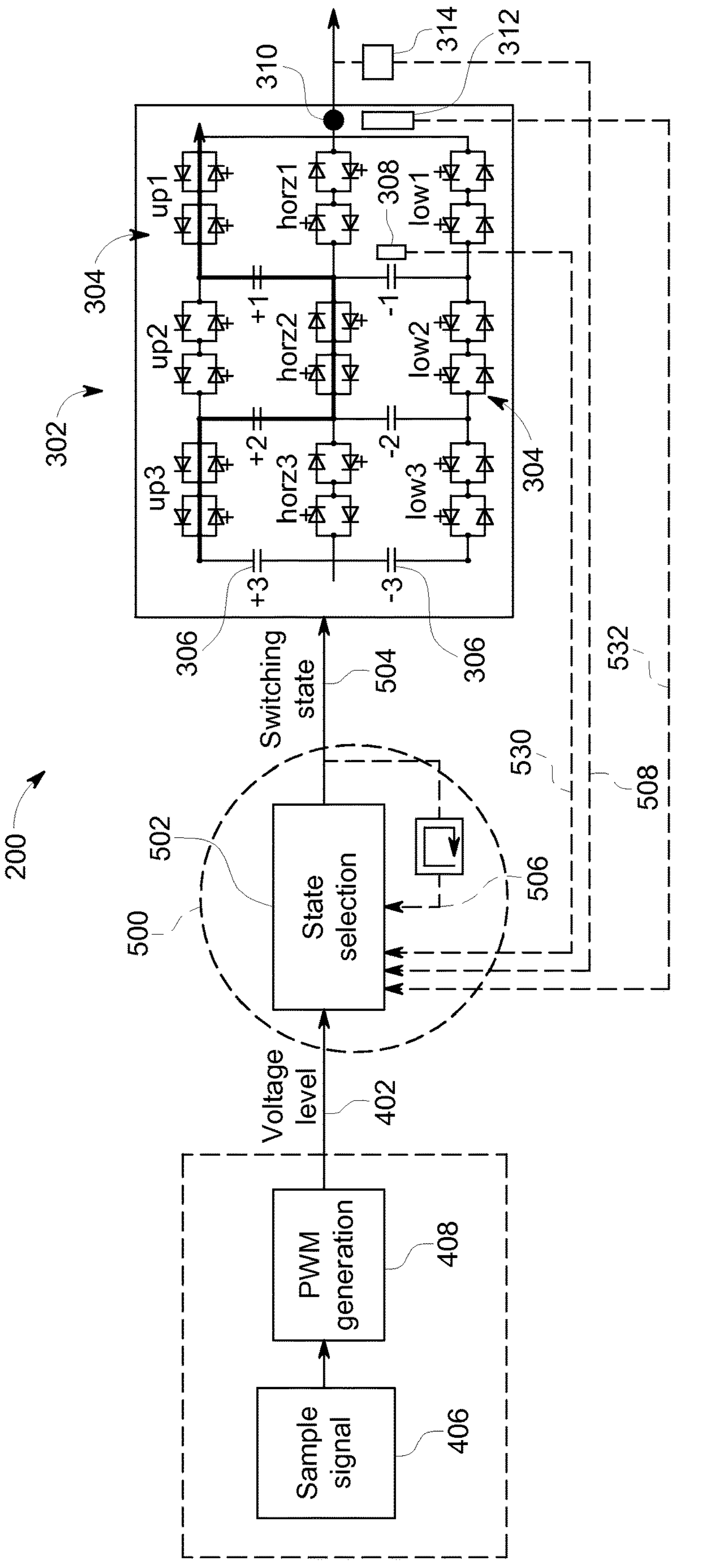
FIG. 7 is a schematic block diagram of a portion of the power converter control system shown in FIG. 2.

FIG. 7 is a schematic block diagram of a portion of power converter control system 200. Specifically, flying capacitor balancing control system 500 is shown. System 500 includes a state selection module 502 that receives pulse pattern 402 and generates a switching state command 504. System 500 also includes a current charging state feedback channel 506 that transmits the details of the real-time charging state of all of the flying capacitors 306 (shown in FIG. 3) in circuit 302 to state selection module 502. System 500 further includes an AC terminal voltage feedback channel 508 coupled to state selection module 502. Similar feedback channels for DC link voltage signals (not shown) are also provided.

Figure 8:
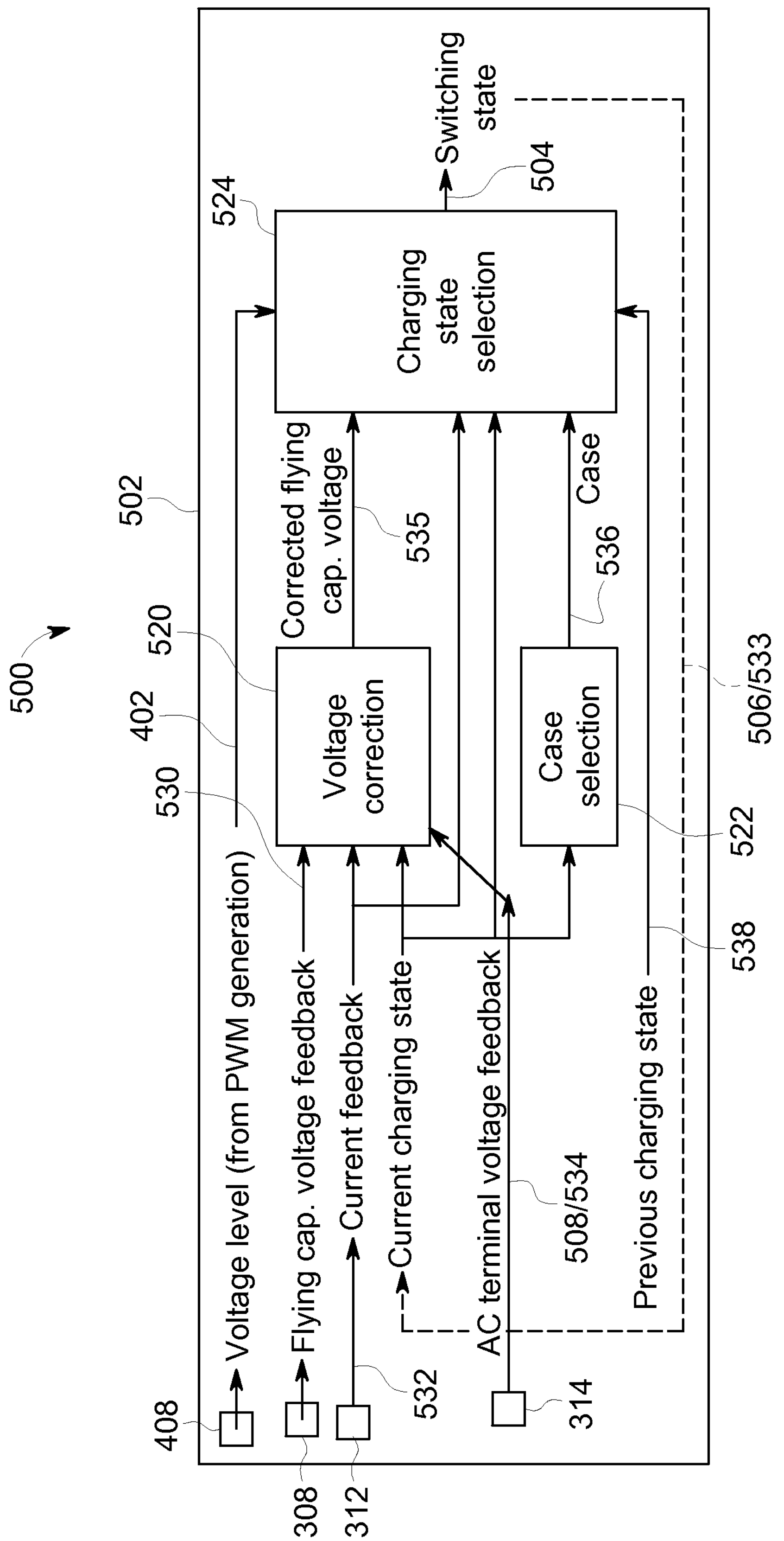
FIG. 8 is a schematic block diagram of an exemplary state selection module that may be used with the portion of the power converter control system shown in FIG. 7.

FIG. 8 is a schematic block diagram of state selection module 502 that may be used with flying capacitor balancing control system 500 of power converter control system 200. State selection module 502 includes a voltage correction submodule 520, a case selection submodule 522, and a charging state selection submodule 524, where each are discussed further below.

Voltage correction submodule 520 receives flying capacitor voltage feedback signals 530 from each voltage measurement device 308 for each flying capacitor 306 (shown in FIG. 3). Voltage correction submodule 520 also receives current measurement feedback signals 532 from current measurement device 312 proximate AC terminal 310 (shown in FIG. 3). Voltage correction submodule 520 further receives current charging state feedback signals 533 through current charging state feedback channel 506. Voltage correction submodule 520 also receives AC terminal voltage measurement feedback signals 534 through AC terminal voltage feedback channel 508. Voltage correction submodule 520 generates and transmits a corrected flying capacitor voltage signal 535 to charging state selection submodule 524.

Case selection submodule 522 is associated with the three different general charging states of neutral 442, middle 444, and corner 446 (all shown in FIG. 6) as described above. Case selection submodule 522 receives current charging state feedback signals 533 and generates and transmits a case selection signal 536 to charging state selection submodule 524.

Charging state selection submodule 524 receives corrected flying capacitor voltage signal 535 and general charging state selection signal 536 as well as current feedback signals 532 and current charging state feedback signals 533. Charging state selection submodule 524 also receives a previous charging state feedback signal 538 from memory device 110 (shown in FIG. 1). Also, charging state selection submodule 524 generates and transmits switching state command 504.

Referring to representation 430 of FIG. 6, and flying capacitor balancing control system 500 in FIGS. 7 and 8, the first case is defined where the existing real-time charging state is neutral charging state 442. State selection module 502, upon receiving pulse pattern 402, determines a switching state, and the associated temporal information, that balances flying capacitor voltages through switching devices 304 by comparing the actual voltage of each flying capacitor 306.

As described above, when the initial charging state is neutral state 442 [0, 0], i.e., Cap2 and Cap1 are balanced, there are always three available states for module 502 to choose from, i.e., a first set of possible future states includes middle states 444 [0, 1], [−1, 0], and corner state 446 [1, −1], and a second set of possible future states includes corner state 446 [−1, 1] and middle states 444 [1, 0] and [0, −1]. As such, state selection module 502 facilitates resolving conflicting charging states of flying capacitors 306.

There are four possible combinations of the two associated flying capacitors that each includes two of the following four possible conditions, each of the four possible conditions based on a comparison between a real-time voltage value of each flying capacitor 306 with respect to a voltage reference value. The first condition is that a voltage of Cap1 ($V_{Cap1}$) is greater than or equal to a voltage reference value for Cap1 ($V_{Cap1,ref}$) generated by state selection module 502 as a function of pulse pattern 402, i.e., the first condition is defined as $V_{Cap1} \geq V_{Cap1,ref}$. A second possible condition is that $V_{Cap1} < V_{Cap1,ref}$. A third possible condition is that $V_{Cap2} \geq V_{Cap1,ref}$. A fourth possible condition is that $V_{Cap2} < V_{Cap2,ref}$.

For the combination of the first and third conditions, the desired charging state is [−1, −1], i.e., the state where the desired condition of both Cap2 and Cap1 is satisfied when both Cap2 and Cap1 are discharging. However, this charging state does not exist. Therefore, the algorithm will select one of middle states 444 [−1, 0] (Cap2 discharging and Cap1 static) and [0, −1] (Cap2 static and Cap1 discharging). Referring to FIG. 5, charging states [−1, 0] and [0, 1] are associated with voltage level +2, and the associated switching states of [1 1 0] and [0 1 1], respectively are selected. If the flying capacitors 306 under consideration are Cap-1 and Cap-2, a similar operation is performed for associated voltage level −1 to generate commands for switching states [−1 0 0] and [0 0 −1], respectively. Switching state command 504 is generated and transmitted accordingly.

In general, the algorithm in module 502 will first attempt to satisfy the desired condition of both of the flying capacitors 306 represented in the charging states. If the conditions of circuit 302 will not allow this possibility, the algorithm allows one of the two associated flying capacitors 306 to remain static at substantially the same voltage, i.e., neither charging nor discharging the associated flying capacitor 306. The algorithm will substantially prevent any flying capacitors from shifting in a direction that would increase an imbalance between the associated flying capacitors 306. As such, if either of the two flying capacitors can be satisfied, but not at the same time, the shifting of the flying capacitors is prioritized by comparing the voltage error as defined by:

$$|V_{Cap1}-V_{Cap1,ref}|>|V_{Cap2}-V_{Cap2,ref}|, \quad \text{Eq. (1)}$$

then Cap2 is discharged and Cap1 remains static, i.e., [−1, 0] is selected. Alternatively, if:

$$|V_{Cap1}-V_{Cap1,ref}|\leq|V_{Cap2}-V_{Cap2,ref}|, \quad \text{Eq. (2)}$$

then Cap2 is static and Cap1 is discharged, i.e., [0, −1] is selected.

For the combination of the second and third conditions, the desired charging state is corner state 446 [−1, 1], i.e., the state where the desired conditions of both Cap1 and Cap2 are satisfied is when Cap2 is discharging and Cap1 is charging. Therefore, the algorithm will select corner state 446 [−1, 1]. Alternatively, for this combination of conditions, one of middle states 444 [−1, 0] and [0, 1] are chosen through determination of equations (1) or (2) above. Switching state command 504 is generated and transmitted as a result of the associations between charging states and switching states as shown in FIG. 5 and described above for the combination of the first and third conditions.

For the combination of the first and fourth conditions, the desired charging state is corner state 446 [1, −1], i.e., the state where the desired conditions of both Cap1 and Cap2 are satisfied is when Cap2 is charging and Cap1 is discharging. Therefore, the algorithm will select corner state 446 [1, −1]. Alternatively, for this combination of conditions, one of middle states 444 [1, 0] and [0, −1] are chosen through determination of equations (1) or (2) as described above. Switching state command 504 is generated and transmitted as a result of the associations between charging states and switching states as shown in FIG. 5 and described above for the combination of the first and third conditions.

For the combination of the second and fourth conditions, the desired charging state is [1, 1], i.e., the state where the desired condition of both Cap2 and Cap1 is satisfied when both Cap2 and Cap1 are charging. However, this charging state does not exist. Therefore, the algorithm will select one of middle states 444 [1, 0] (Cap2 charging and Cap1 static) and [0, 1] (Cap2 static and Cap1 charging). Switching state command 504 is generated and transmitted as a result of the associations between charging states and switching states as shown in FIG. 5 and described above for the combination of the first and third conditions, and the selected switching state is set in electrical circuit 302.

For the second case, when the initial charging state is one of the four middle states 444, i.e., charging states [0, 1], [0, −1], [−1, 0], and [1, 0], the algorithm in state selection module 502 uses a different method of determining the selected charging state than that for neutral state [0, 0]. If the initial charging state is one of [1, 0] or [−1, 0], i.e., a middle state 444 on the Cap2 horizontal axis in FIG. 6, Cap1 receives the priority for determining the next charging state. Similarly, when the initial charging state is one of [0, 1] or [0, −1], i.e., a middle state 444 on the Cap1 vertical axis in FIG. 6, Cap2 receives the priority for determining the next charging state. In a manner similar to the first case described above, the selection of the next charging state is substantially based on a comparison between a real-time measured voltage across each flying capacitor 306 with respect to an associated reference voltage value. As such, state selection module 502 facilitates resolving conflicting charging states of flying capacitors 306.

When the initial charging state is [1, 0], two possible charging states are available. If $V_{Cap1}<V_{Cap1,ref}$, then the next charging state to be selected is [0, 1]. If $V_{Cap1}\geq V_{Cap1,ref}$, then the next charging state to be selected is [1, −1]. When the initial charging state is [−1, 0], two possible charging states are available. If $V_{Cap1}<V_{Cap1,ref}$, then the next charging state to be selected is [−1, 1]. If $V_{Cap1}\geq V_{Cap1,ref}$, then the next charging state to be selected is [0, −1]. When the initial charging state is [0, 1], two possible charging states are available. If $V_{Cap2}<V_{Cap2,ref}$, then the next charging state to be selected is [1, 0]. If $V_{Cap2}\geq V_{Cap2,ref}$, then the next charging state to be selected is [–, −1]. When the initial charging state is [0, −1], two possible charging states are available. If $V_{Cap2}<V_{Cap2,ref}$, then the next charging state to be selected is [1, −1]. If $V_{Cap2}\geq V_{Cap2,ref}$, then the next charging state to be selected is [−1, 0]. As such, state selection module 502 facilitates resolving conflicting charging states of flying capacitors 306.

Switching state command 504 is generated and transmitted as a result of the associations between charging states and switching states as shown in FIG. 5 and described above. As a result of regulating, i.e., balancing the voltages across flying capacitors 306 within electrical circuit 302, the measured voltage values at AC terminal 310 are regulated.

Figure 9:
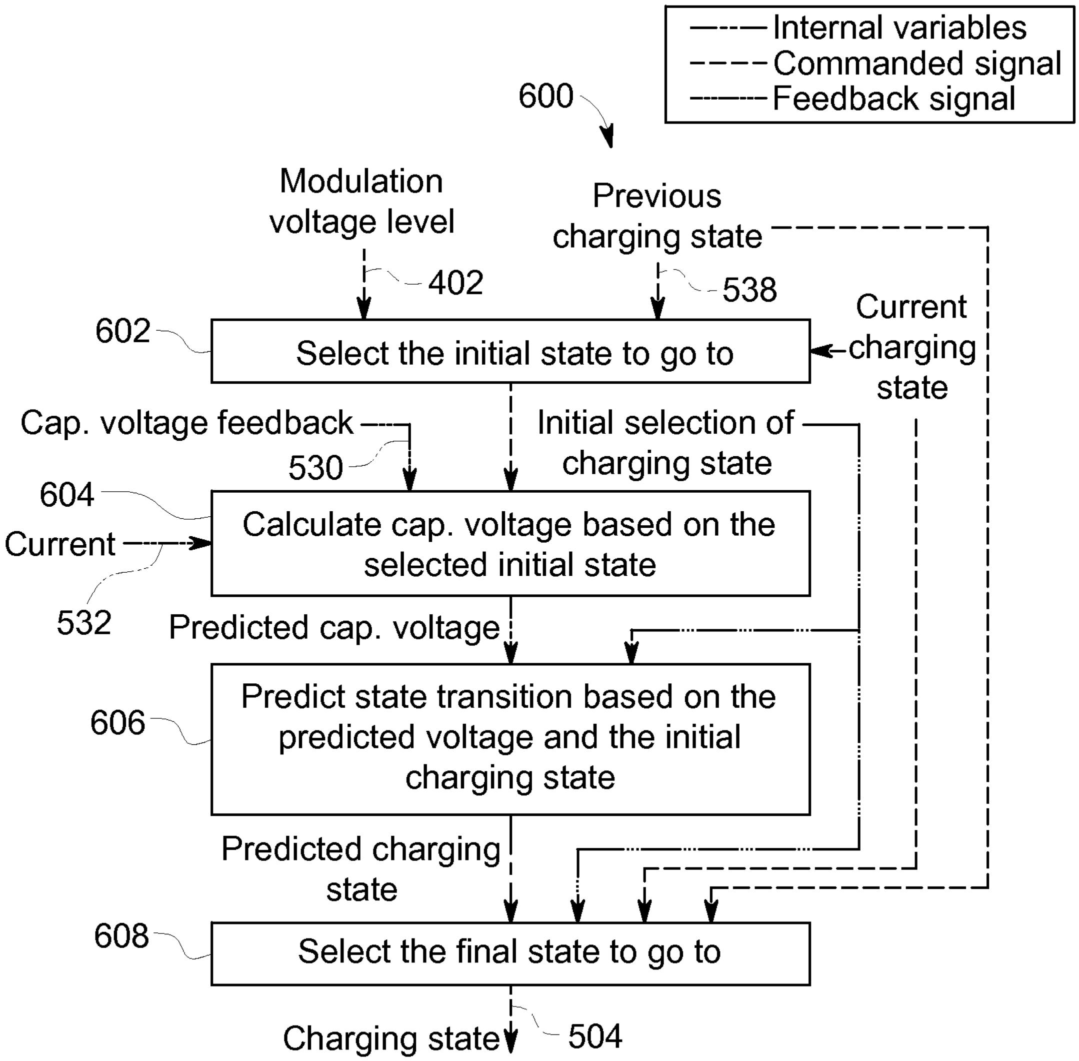
FIG. 9 is a flow chart of an exemplary method of determining a charging state for the multilevel power converter electrical circuit shown in FIG. 3 when the initial charging state is a corner state.

FIG. 9 is a flow chart of an exemplary method 600 of determining a charging state for multilevel power converter electrical circuit 302 (shown in FIG. 3) when the initial charging state is a corner charging state 446 [−1, 1] and [1, −1] (both shown in FIG. 6), i.e., the third case. In general, method 600 includes determining the next selected state transition based on an initial choice of switching state and then predicting the voltages across each flying capacitor 306 based on that decision.

In the exemplary embodiment, method 600 uses a model predictive control (MPC) strategy to facilitate determining the next state transition using the physics-based model of electrical circuit 302. In general, MPC is a feedback mechanism in which physics-based models are used to predict particular system dynamics. The MPC problem to be solved is formulated as solving in real-time a control problem subject to system dynamics and constraints involving states and controls. Based on measurements obtained at time t=0, a system controller may be used to predict the future dynamic behavior of the system over a prediction time horizon at t=Tp and determine an input such that a determined performance objective function is optimized.

The first step in method 600 is select 602 the initial state to go to. Inputs to step 602 includes pulse pattern 402 and previous charging state feedback signal 538. For the condition where the current charging state is [−1, 1], there are only two potential charging states that can be transitioned to, i.e., [0, 1] and [−1, 0]. Method 600 is configured to prevent a return to an immediately previous charging state. Therefore, if either of states [0, 1] and [−1, 0] was the most recent state transitioned from, it is removed from consideration and the other state is selected. For example, if state [0, 1] is input as signal 538, state [0, 1] is not selected and state [−1, 0] is selected for evaluation as the initial state.

The second step in method 600 is to calculate 604 a predicted voltage of flying capacitors 306 (shown in FIGS. 3 and 7). Inputs to step 604 include the output of step 602, flying capacitor voltage feedback signals 530, and current feedback signals 532. The predicted voltages of associated flying capacitors 306 are calculated based on the real-time flying capacitor voltages, real-time current measurements at AC terminal 310 shown in FIGS. 3 and 7), and the initial charging state, in this example, [−1 1].

The third step in method 600 is to predict 606 the state transition sequence based on the predicted flying capacitor voltages from step 604 and the initial charging state, in this example, [−1, 0]. There are two possible state transition sequences after selection of [−1, 0], i.e., charging states [−1, 1] and [0, −1].

The fourth step in method 600 is to select 608 the final state to go to. In evaluating the first of the next charging states after the initial choice of charging state [−1, 0], the subsequent state would be the current state, i.e., charging state [−1, 0]. Moreover, the next charging state after [−1, 1] is [0, 1], i.e., the most recently previous charging state. As described above, returning to a recent previous charging state is not desirable. One reason is that there is a chance that the algorithm may spend too much time switching back and forth in the corner and one of the flying capacitors may be excessively discharged prior to being charged again. As such, the subsequent charging state of [0, −1] means that a new charging state will be selected, which is desirable. Therefore, charging state [−1, 0] is selected.

There is a special condition for starting at a corner state 446 that is considered, i.e., when the previous charging state was neutral state 442 [0, 0]. There are three scenarios and each is discussed in turn.

The first scenario is when given the two choices for the next charging state, and one choice is obviously better than the other, the action is to choose the better option. For example, if the process starts at charging state [−1, 1], $V_{Cap2}\geq V_{Ca21,ref}$, and $V_{Cap1}\geq V_{Cap1,ref}$, then the desired charging state is [−1, −1], which does not exist. Therefore, one of the options that exists is [0, 1]. However, having Cap2 static and having Cap1 charging when both Cap1 and Cap2 exceed the associated reference voltages is not a good choice. As such, as a function of resolving conflicting charging states of flying capacitors 306, charging state [−1, 0] is chosen.

The second scenario is when, given the two options for the next charging state, and both options are good, the action is to compare the voltage errors and choose the option that favors the flying capacitors with voltages farther away from the reference voltage. For example, if the process starts at [1, −1], $V_{Cap2}<V_{Cap1,ref}$, and $V_{Cap1}\geq V_{Cap1,ref}$, then the two choices for the desired charging state of [1, 0] and [0, −1] are good options. If Cap1 is further way from the reference, as a function of resolving conflicting charging states of flying capacitors 306, [0, −1] is chosen so that Cap1 voltage is decreased first.

The third scenario is when, given the two options for the next charging state, and both options are bad options, the action is to compare the voltage error and choose the option that causes the least undesirable conditions. For example, if the process starts at charging state [−1, 1], $V_{Cap2} \geq V_{Cap1,ref}$, and $V_{Cap1} < V_{Cap1,ref}$, then both [1, 0] and [0, −1] are bad options because discharging of Cap2 and charging of Cap1 are desirable. If Cap1 is farther away from the reference voltage, as a function of resolving conflicting charging states of flying capacitors 306, [1, 0] is chosen so that Cap1 voltage is maintained at the same level and Cap2 voltage is maintained high for the time being.

The above-described multilevel power converters and their associated control systems provide for enhanced control of electric power conversion. Specifically, the embodiments described herein facilitate balancing the voltages of the flying capacitors within the power converters. Using a seven-level topology, the multilevel power converters described herein generate a low-distortion multilevel pulse pattern and higher output voltages at the output of the power converters as compared to known converters. Such higher voltages include 10 kilovolts (kV) and 13.8 kV at the outputs of medium voltage converters. As such, the multilevel power converters described herein facilitate improved total harmonic distortion (THD) performance and increased electric power conversion. The improved THD performance facilitates decreasing the size and complexity of electrically coupled harmonic filters, thereby decreasing the costs of assembling, operating, and maintaining electric power systems. In addition, rather than the additional costs associated with the additional hardware for voltage balancing power circuits, balancing of the voltage associated with the flying capacitors is achieved through software-implements balancing algorithms and instructions. The balancing algorithms and instructions described herein convert switching states, i.e., aggregate switching configurations within the electrical circuit defined by the associated switching devices to aggregate charging states of the electrical circuit defined by the flying capacitors. Moreover, the multilevel power converters and associated control systems described herein facilitate a two-step process, where the first pulse-width-modulation (PWM) generation step is decoupled from the second state selection step.

An exemplary technical effect of the methods, systems, and apparatus described herein includes at least one of: (a) balancing the voltages across a plurality of flying capacitors within multilevel electric power converters; (b) decreasing the amount of voltage balancing hardware for balancing the voltages of the flying capacitors in multilevel electric power converters; (c) decreasing the size of harmonic filters in electric power systems; (d) decreasing distortion in the waveforms of electric power transmitted from multilevel electric power converters into electric power systems; voltage sensors used in multilevel converters; and (e) resolving conflicting charging states of each of the flying capacitors.

Exemplary embodiments of methods, systems, and apparatus for operating electric power conversion system are not limited to the specific embodiments described herein, but rather, components of systems and/or steps of the methods may be utilized independently and separately from other components and/or steps described herein. For example, the methods, systems, and apparatus may also be used in combination with other systems requiring precise voltage balancing of a plurality of flying capacitors through control of a plurality of switching devices to operate multilevel power converters, and the associated methods, and are not limited to practice with only the systems and methods as described herein. Rather, the exemplary embodiment can be implemented and utilized in connection with many other applications, equipment, and systems that may benefit from extensive voltage balancing through control of a plurality of switching devices.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of operating a multilevel power converter including an electrical circuit, the electrical circuit including a plurality of switching devices, a plurality of flying capacitors, and at least one alternating current (AC) terminal, said method comprising regulating a voltage level of the at least one AC terminal comprising:

using, by a processing device, a model of the electrical circuit stored in a memory device, the model including a software model representative of at least a portion of a specific physical circuit topology of the electrical circuit, the specific physical circuit topology including the plurality of switching devices and the plurality of flying capacitors of the electrical circuit, the model used by the processing device to predict future dynamic behavior of the electrical circuit over a defined period of time, the future dynamic behavior including a predicted voltage on at least one flying capacitor of the plurality of flying capacitors, possible switching states of the electrical circuit, and possible charging states of the electrical circuit;

selecting, at least partially based on the model of the electrical circuit, at least one possible switching state of the electrical circuit from a plurality of possible switching states of the electrical circuit, wherein each possible switching state of the electrical circuit has a voltage level that at least partially corresponds to a commanded voltage level for the at least one AC terminal, and wherein each possible switching state of the electrical circuit defines a switching state of each switching device of the plurality of switching devices, wherein each switching state of the electrical circuit has at least one corresponding charging state of the electrical circuit;

selecting, at least partially based on an output from the model of the electrical circuit including the predicted voltage on at least one flying capacitor of the plurality of flying capacitors determined by use of the model, and the at least one selected possible switching state of the electrical circuit, a possible charging state of the electrical circuit such that performance of the electrical circuit, and voltage balancing of the plurality of flying capacitors therein, as predicted by use of the model, is improved over the defined period of time, wherein each possible charging state of the electrical circuit defines a charging state of each flying capacitor of the plurality of flying capacitors, and wherein selecting a possible charging state of the electrical circuit comprises resolving conflicting charging states of each flying capacitor of the plurality of flying capacitors and selecting a switching state corresponding to the commanded voltage level;

selecting, using the processing device, a charging state transition sequence for the electrical circuit from a present charging state of the electrical circuit to the selected possible charging state of the electrical circuit based on the predicted voltage on the at least one flying capacitor of the plurality of flying capacitors, the transition sequence including at least one charging state different from the present charging state and the selected possible charging state; and setting the switching state of the electrical circuit at least partially based on the selected charging state of the electrical circuit.

2. The method in accordance with claim 1 further comprising predicting a plurality of possible charging states of the electrical circuit comprising:

storing a voltage reference value for each flying capacitor of the plurality of flying capacitors in the memory device, the memory device coupled to the processing device;

predicting, using the processing device, a voltage value across each flying capacitor of the plurality of flying capacitors; and determining, using the processing device, a comparison between each voltage reference value and each predicted voltage value for each flying capacitor of the plurality of flying capacitors.

3. The method in accordance with claim 2 further comprising generating pulse signals with a commanded voltage value and a temporal pulse duration value, wherein predicting a plurality of possible charging states of the electrical circuit further comprises generating a prediction of possible future charging states of the electrical circuit over the defined period of time through:

a measured voltage value across each flying capacitor of the plurality of flying capacitors;

the predicted voltage value across each flying capacitor of the plurality of flying capacitors;

a measured current value through the at least one AC terminal;

the generated pulse signals;

the model of the of the electrical circuit; and at least one previously commanded electrical circuit charging state.

4. The method in accordance with claim 3, wherein predicting a plurality of possible charging states of the electrical circuit comprises:

selecting, using the processing device, an initial possible charging state of the electrical circuit from the plurality of possible charging states of the electrical circuit to shift from the present charging state of the electrical circuit; and calculating, using the processing device, a predicted voltage value on at least one flying capacitor of the plurality of flying capacitors based on the selected initial possible charging state of the electrical circuit and the model of the electrical circuit.

5. The method in accordance with claim 4, wherein selecting an initial possible charging state of the electrical circuit comprises selecting an initial possible charging state from a predetermined number of predefined charging states, wherein the predetermined number of predefined charging states is less than a total number of the plurality of possible charging states.

6. The method in accordance with claim 1 further comprising regulating a voltage across each flying capacitor of the plurality of flying capacitors based on a measured output current flow of the multilevel power converter at the at least one AC terminal.

7. The method in accordance with claim 1 further comprising:

storing a voltage reference value for each flying capacitor of the plurality of flying capacitors in the memory device, the memory device coupled to the processing device;

measuring a voltage value across each flying capacitor of the plurality of flying capacitors; and determining, using the processing device, a comparison between each voltage reference value and each measured voltage value for each flying capacitor of the plurality of flying capacitors.

8. The method in accordance with claim 1, wherein selecting at least one possible switching state of the electrical circuit comprises generating, using the processing device, a prediction of thermal conditions for each switching device of the plurality of switching devices.

9. The method in accordance with claim 1, wherein selecting at least one possible switching state of the electrical circuit comprises generating, using the processing device, a plurality of switching states of the electrical circuit.

10. The method in accordance with claim 1 further comprising generating, using the processing device, the model of the electrical circuit, at least in part, from one or more historical switching states of the electrical circuit and one or more historical charging states of the electrical circuit.

11. An electrical circuit for a multilevel power converter, said electrical circuit comprising:

a plurality of electrically conductive elements configured substantially parallel to each other;

a plurality of switching devices, each switching device of said plurality of switching devices coupled to one electrically conductive element of said plurality of electrically conductive elements;

a plurality of flying capacitors coupled to each of two adjacent electrically conductive elements of said plurality of electrically conductive elements;

at least one alternating current (AC) terminal; and a processing device comprising a model of said electrical circuit resident thereon, the model including a software model representative of at least a portion of a specific physical circuit topology of said electrical circuit, the specific physical circuit topology including said plurality of switching devices, said plurality of flying capacitors, and said plurality of electrically conductive elements, the model used by said processing device to predict future dynamic behavior of said electrical circuit over a defined period of time, the future dynamic behavior including a predicted voltage on at least one flying capacitor of the plurality of flying capacitors, possible switching states of said electrical circuit, and possible charging states of said electrical circuit, said processing device configured to:

select, at least partially based on said model of said electrical circuit, at least one possible switching state of said electrical circuit from a plurality of possible switching states of said electrical circuit, wherein each possible switching state of said electrical circuit has a voltage level that at least partially corresponds to a commanded voltage level for said at least one AC terminal, and wherein each possible switching state of said electrical circuit defines a switching state of each switching device of said plurality of switching devices, wherein each switching state of said electrical circuit has at least one corresponding charging state of said electrical circuit;

select, at least partially based on an output from said model of said electrical circuit including the predicted voltage on at least one flying capacitor of the plurality of flying capacitors determined by use of the model, and the selected possible switching state of said electrical circuit, a possible charging state of said electrical circuit such that performance of the electrical circuit, and voltage balancing of the plurality of flying capacitors therein, as predicted by use of the model, is improved over the defined period of time, wherein each possible charging state of said electrical circuit defines a charging state of each flying capacitor of said plurality of flying capacitors, and wherein selecting a possible charging state of said electrical circuit comprises resolving conflicting charging states of said each flying capacitor of said plurality of flying capacitors and selecting a switching state corresponding to the commanded voltage level;

select, using said processing device, a charging state transition sequence for said electrical circuit from a present charging state of said electrical circuit to the selected possible charging state of said electrical circuit based on the predicted voltage on the at least one flying capacitor of the plurality of flying capacitors, the transition sequence including at least one charging state different from the present charging state and the selected possible charging state; and set the switching state of said electrical circuit at least partially based on the selected charging state of said electrical circuit.

12. The electrical circuit in accordance with claim 11 further comprising:

a memory device coupled to said processing device, said memory device configured to store a voltage reference value for said each flying capacitor of said plurality of flying capacitors; and a plurality of voltage measurement devices, at least one voltage measurement device of said plurality of voltage measurement devices coupled to said each flying capacitor of said plurality of flying capacitors, said processing device further configured to predict a plurality of possible charging states of said electrical circuit, said processing device further configured to:

predict a voltage value across said each flying capacitor of said plurality of flying capacitors; and determine a comparison between each voltage reference value and each predicted voltage value for said each flying capacitor of said plurality of flying capacitors.

13. The electrical circuit in accordance with claim 12, said processing device further configured to:

generate pulse signals with a commanded voltage value and a temporal pulse duration value; and generate a prediction of possible future charging states of said electrical circuit over the defined period of time through:

a measured voltage value across said each flying capacitor of said plurality of flying capacitors;

the predicted voltage value across said each flying capacitor of said plurality of flying capacitors;

a measured current value through said at least one AC terminal;

the generated pulse signals;

said model of the of said electrical circuit; and at least one previously commanded electrical circuit charging state.

14. The electrical circuit in accordance with claim 13, said processing device further configured to:

select an initial possible charging state of said electrical circuit from the plurality of possible charging states of said electrical circuit to shift from the present charging state of said electrical circuit; and calculate a predicted voltage value on at least one flying capacitor of said plurality of flying capacitors based on the selected initial possible charging state of said electrical circuit and said model of said electrical circuit.

15. The electrical circuit in accordance with claim 14, said processing device further configured to select an initial possible charging state from a predetermined number of predefined charging states, wherein the predetermined number of predefined charging states is less than a total number of the plurality of possible charging states.

16. The electrical circuit in accordance with claim 11 further comprising:

at least one voltage measurement device coupled to said at least one AC terminal; and a memory device coupled to said processing device, said memory device configured to store a plurality of voltage measurement values transmitted from said at least one voltage measurement device, said processing device further configured to regulate a voltage of said multilevel power converter at said at least one AC terminal as a function of the regulated voltages across said each flying capacitor of said plurality of flying capacitors.

17. The electrical circuit in accordance with claim 11 further comprising:

at least one current measurement device coupled to said at least one AC terminal; and a memory device coupled to said processing device, said memory device configured to store a plurality of current measurement values transmitted from said at least one current measurement device, said processing device further configured to regulate the voltage across said each flying capacitor of said plurality of flying capacitors at least partially as a function of the plurality of current measurement values.

18. The electrical circuit in accordance with claim 11 further comprising:

a memory device coupled to said processing device, said memory device configured to store a voltage reference value for said each flying capacitor of said plurality of flying capacitors; and a plurality of voltage measurement devices, at least one voltage measurement device of said plurality of voltage measurement devices coupled to said each flying capacitor of said plurality of flying capacitors, wherein:

said at least one voltage measurement device of said plurality of voltage measurement devices configured to measure a voltage value across said each flying capacitor of said plurality of flying capacitors; and said processing device further configured to determine a comparison between each voltage reference value and each measured voltage value for said each flying capacitor of said plurality of flying capacitors.

19. The electrical circuit in accordance with claim 11, said processing device further configured to:

generate a prediction of a voltage value across said each flying capacitor of said plurality of flying capacitors; and generate a prediction of thermal conditions for said each switching device of said plurality of switching devices.

20. The electrical circuit in accordance with claim 11, said processing device further configured to generate a plurality of switching states of said electrical circuit, wherein each switching state of the plurality of switching states of said electrical circuit relates to a unique charging state of the plurality of possible charging states of said electrical circuit.

21. The electrical circuit in accordance with claim 11, said processing device further configured to generate said model of said electrical circuit.

22. An electric power system comprising:

an alternating current (AC) source;

a direct current (DC) link; and a multilevel power converter comprising an electrical circuit extending between said AC source and said DC link, said electrical circuit comprising:

a plurality of electrically conductive elements configured substantially parallel to each other;

a plurality of switching devices, each switching device of said plurality of switching devices coupled to one electrically conductive element of said plurality of electrically conductive elements;

a plurality of flying capacitors coupled to each of two adjacent electrically conductive elements of said plurality of electrically conductive elements;

at least one AC terminal; and a processing device comprising a model of said electrical circuit resident thereon, the model including a software model representative of at least a portion of a specific physical circuit topology of said electrical circuit, the specific physical circuit topology including said plurality of electrically conductive elements, said plurality of switching devices, and said plurality of flying capacitors, the model used by said processing device to predict future dynamic behavior of said electrical circuit over a defined period of time, the future dynamic behavior including a predicted voltage on at least one flying capacitor of the plurality of flying capacitors, possible switching states of said electrical circuit, and possible charging states of said electrical circuit, said processing device configured to:

select, at least partially based on said model of said electrical circuit, at least one possible switching state of said electrical circuit from a plurality of possible switching states of said electrical circuit, wherein each possible switching state of said electrical circuit has a voltage level that at least partially corresponds to a commanded voltage level for said at least one AC terminal, and wherein each possible switching state of said electrical circuit defines a switching state of each switching device of said plurality of switching devices, wherein each switching state of said electrical circuit has at least one corresponding charging state of said electrical circuit;

select, at least partially based on an output from said model of said electrical circuit including the predicted voltage on at least one flying capacitor of the plurality of flying capacitors determined by use of the model, and at least partially based on the selected possible switching state of said electrical circuit, a possible charging state of said electrical circuit such that performance of the electrical circuit, and voltage balancing of the plurality of flying capacitors therein, as predicted by use of the model, is improved over the defined period of time, wherein each possible charging state of said electrical circuit defines a charging state of each flying capacitor of said plurality of flying capacitors, and wherein selecting a possible charging state of said electrical circuit comprises resolving conflicting charging states of said each flying capacitor of said plurality of flying capacitors and selecting a switching state corresponding to the commanded voltage level;

select, using said processing device, a charging state transition sequence for said electrical circuit from a present charging state of said electrical circuit to the selected possible charging state of said electrical circuit based on the predicted voltage on the at least one flying capacitor of the plurality of flying capacitors, the transition sequence including at least one charging state different from the present charging state and the selected possible charging state; and set the switching state of said electrical circuit at least partially based on the selected charging state of said electrical circuit.

23. The electric power system in accordance with claim 22 further comprising:

a memory device coupled to said processing device, said memory device configured to store a voltage reference value for said each flying capacitor of said plurality of flying capacitors; and a plurality of voltage measurement devices, at least one voltage measurement device of said plurality of voltage measurement devices coupled to said each flying capacitor of said plurality of flying capacitors, said processing device further configured to predict a plurality of possible charging states of said electrical circuit, said processing device further configured to:

predict a voltage value across said each flying capacitor of said plurality of flying capacitors; and determine a comparison between each voltage reference value and each predicted voltage value for said each flying capacitor of said plurality of flying capacitors.

24. The electric power system in accordance with claim 23, said processing device further configured to:

generate pulse signals with a commanded voltage value and a temporal pulse duration value; and generate a prediction of possible future charging states of said electrical circuit over the defined period of time through:

a measured voltage value across said each flying capacitor of said plurality of flying capacitors;

the predicted voltage value across said each flying capacitor of said plurality of flying capacitors;

a measured current value through said at least one AC terminal;

the generated pulse signals;

said model of the of said electrical circuit; and at least one previously commanded electrical circuit charging state.

25. The electric power system in accordance with claim 24, said processing device further configured to:

select an initial possible charging state of said electrical circuit from the plurality of possible charging states of said electrical circuit to shift from the present charging state of said electrical circuit; and calculate a predicted voltage value on at least one flying capacitor of said plurality of flying capacitors based on the selected initial possible charging state of said electrical circuit and said model of said electrical circuit.

26. The electrical circuit in accordance with claim 25, said processing device further configured to select an initial possible charging state from a predetermined number of predefined charging states, wherein the predetermined number of predefined charging states is less than a total number of the plurality of possible charging states.

27. The electric power system in accordance with claim 22 further comprising:

a memory device coupled to said processing device, said memory device configured to store a voltage reference value for said each flying capacitor of said plurality of flying capacitors; and a plurality of voltage measurement devices, at least one voltage measurement device of said plurality of voltage measurement devices coupled to said each flying capacitor of said plurality of flying capacitors, wherein:

said at least one voltage measurement device of said plurality of voltage measurement devices configured to measure a voltage value across said each flying capacitor of said plurality of flying capacitors; and said processing device further configured to determine a comparison between each voltage reference value and each measured voltage value for said each flying capacitor of said plurality of flying capacitors.

28. The electric power system in accordance with claim 22, said processing device further configured to:

generate a prediction of a voltage value across said each flying capacitor of said plurality of flying capacitors; and generate a prediction of thermal conditions for said each switching device of said plurality of switching devices.

29. The electric power system in accordance with claim 22, said processing device further configured to generate a plurality of switching states of said electrical circuit.

* * * * *